(12) United States Patent
Nishina

(10) Patent No.: US 6,434,851 B1
(45) Date of Patent: Aug. 20, 2002

(54) CONSTANT PRESSURE MECHANISM OF PROBE

(75) Inventor: Shingo Nishina, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/564,631

(22) Filed: May 3, 2000

(30) Foreign Application Priority Data

May 11, 1999 (JP) .......................................... 11-129574

(51) Int. Cl.$^7$ ................................................. G01B 5/02
(52) U.S. Cl. ........................................... 33/559; 33/561
(58) Field of Search .................... 33/559, 556, 501, 33/33, 561, 558, 815

(56) References Cited

U.S. PATENT DOCUMENTS

| | | | | |
|---|---|---|---|---|
| 1,006,924 A | * | 10/1911 | Erb | ............... 33/559 |
| 3,945,124 A | * | 3/1976 | Jacoby et al. | ............... 33/559 |
| 4,117,601 A | * | 10/1978 | Kober et al. | ............... 33/561 |
| 4,330,942 A | * | 5/1982 | Blechmann | ............... 33/556 |
| 4,685,648 A | | 8/1987 | Dobner et al. | ............... 248/572 |
| 4,953,748 A | * | 9/1990 | Wheelock | ............... 221/59 |
| 5,037,059 A | | 8/1991 | Asano et al. | ............... 248/572 |

FOREIGN PATENT DOCUMENTS

| | | |
|---|---|---|
| DE | 34 44 956 A1 | 6/1985 |
| FR | 2 435 242 A1 | 4/1980 |
| JP | 405099951 | * 4/1993 |
| JP | 409273926 | * 10/1997 |
| JP | 410288630 | * 10/1998 |
| JP | A-10-315469 | 12/1998 |
| JP | A-11-257904 | 9/1999 |
| JP | A-2000-121304 | 4/2000 |

* cited by examiner

*Primary Examiner*—Diego Gutierrez
*Assistant Examiner*—R. Alexander Smith
(74) *Attorney, Agent, or Firm*—Oliff & Berridge PLC

(57) ABSTRACT

A constant pressure mechanism of a probe for urging the probe in a predetermined direction by virtue of elastic force of a spring is provided. The mechanism comprises a circular pulley rotatably supported around a central axis by an instrument stationary portion, a rotation force urging mechanism for urging the pulley in the predetermined direction, and a first wire adjoining the pulley to the probe. The rotation force urging mechanism comprises a spiral pulley coaxial with and capable of combined rotation with the circular pulley, and a second wire connecting the spiral pulley to the spring. The other end of the spring is connected to the instrument stationary portion. Strict contact pressure of the probe is maintained throughout its motion.

5 Claims, 7 Drawing Sheets

F I G. 2
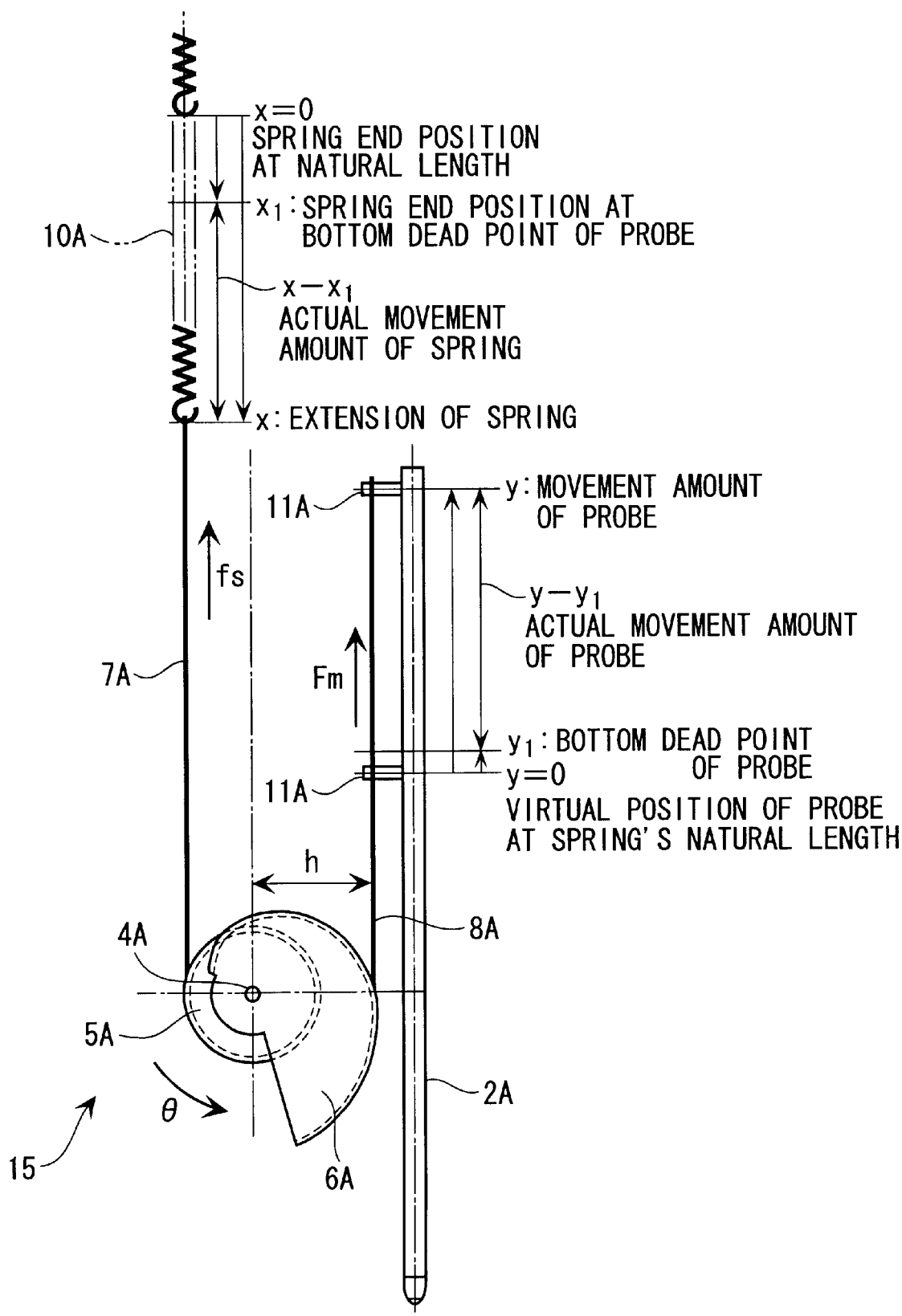

CONSTANT PRESSURE MECHANISM OF PROBE

BACKGROUND OF THE INVENTION

1. Field of the Invention

The present invention relates to a constant pressure mechanism for a probe of contact measuring instrument.

2. Description of Related Art

As widely known, a probe (measurement portion) is pressed onto a target surface by virtue of force of coil spring during measurement with a measuring instrument such as dial gauge. However, if the probe is merely pressed by the coil spring, biasing force of the coil spring changes in accordance with flexed degree of the coil spring, which causes change in contact force according to movement of the probe.

More specifically, when the biasing force of the coil spring changes in accordance with movement of the probe, contact pressure of the probe applied to the target surface also changes in accordance therewith, so that the target surface itself can be deformed or the support condition of the workpiece changes by a counterforce corresponding thereto, thus being unable to obtain correct measurement result with reproducibility.

In view of the above problem, the Applicant of the present patent application has proposed a constant pressure mechanism for pressing the probe at an approximately constant force irrespective of movement amount thereof in Japanese Patent Application No. Hei 10-82788 (Japanese Patent Application Laid-Open Publication No., Hei 11-257904) and Japanese Patent Application No. Hei 10-315469.

However, according to the above constant pressure mechanism, though the measurement pressure of the probe can be maintained approximately constant irrespective of movement amount of the probe, the entire dimension of the mechanism can be significantly large when the movement distance of the probe is large and weight of the mechanism can be increased. Therefore, the above constant pressure mechanism is not suitably used for a probe with large measurement distance

SUMMARY OF THE INVENTION

An object of the present invention is to provide a constant pressure mechanism of a probe with small outer dimension and light weight and capable of pressing the probe at an approximately constant pressure even when the movement distance of the probe is large.

For attaining an object of the present invention, the present invention is a constant pressure mechanism of a probe for unidirectionally urging the probe in a predetermined direction by virtue of elastic force of a spring. The constant pressure mechanism of a probe having: a first pulley rotatably supported around a central axis by an instrument stationary portion; a rotation force urging mechanism for urging the first pulley in a predetermined rotation direction; and a first wire having a first end fixed to the first pulley and a second end jointed to the probe.

In the present invention, the rotation force urging mechanism may preferably include: a second pulley coaxial with the first pulley and capable of combined rotation therewith; and a second wire having an end fixed to the second pulley and the spring, the spring having one end being fixed to the instrument stationary portion with a free end jointed to the other end of the second wire.

The first pulley and the second pulley may be respectively either a circular pulley or a spiral pulley. The spiral pulley on one side can change effective diameter relative to the wire, thus appropriately adjusting rotation force for the same displacement. For instance, increase rate of the pull strength differs in a condition where the spring is stretched and a condition where the spring is not stretched even for the same displacement. However, since the spiral pulley is used so that the radius relative to the wire length becomes small when the spring is stretched, always constant pull strength can be generated.

The spring may be a coil spring, or alternatively, may be a plate spring.

The rotation force urging mechanism may be composed of a spiral spring having an end being fixed to the instrument stationary portion and the other end being jointed to the first pulley.

In the present invention, a counter mechanism may preferably be connected to an inner end of the probe. The counter mechanism may be a counter pinion meshed with the probe, thus counting by a rotary encoder etc.

BRIEF DESCRIPTION OF THE DRAWINGS

FIG. 2 is an illustration of principle of the constant pressure mechanism of a probe;

FIG. 6(*b*) is a right side elevation of a primary portion of the constant pressure mechanism of a probe according to the third embodiment of the present invention;

FIG. 6(*c*) is a rear elevation of a primary portion of constant pressure mechanism according to the third embodiment of the present invention;

FIG. 7(*b*) is a left side elevation of a primary portion of the constant pressure mechanism according to the fourth embodiment of the present invention;

FIG. 7(*c*) is a front elevation of a primary portion of the constant pressure mechanism according to the fourth embodiment of the present invention;

FIG. 8(*b*) is a left side elevation of a primary portion of the constant pressure mechanism of a probe according to the fifth embodiment of the present invention; and FIG. 8(*c*) is a front elevation of a primary portion of the constant pressure mechanism of a probe according to the fifth embodiment of the present invention.

DETAILED DESCRIPTION OF PREFERRED EMBODIMENT(S)

Preferred embodiments of the present invention will be described below in detail with reference to attached drawings.

Figure 1:
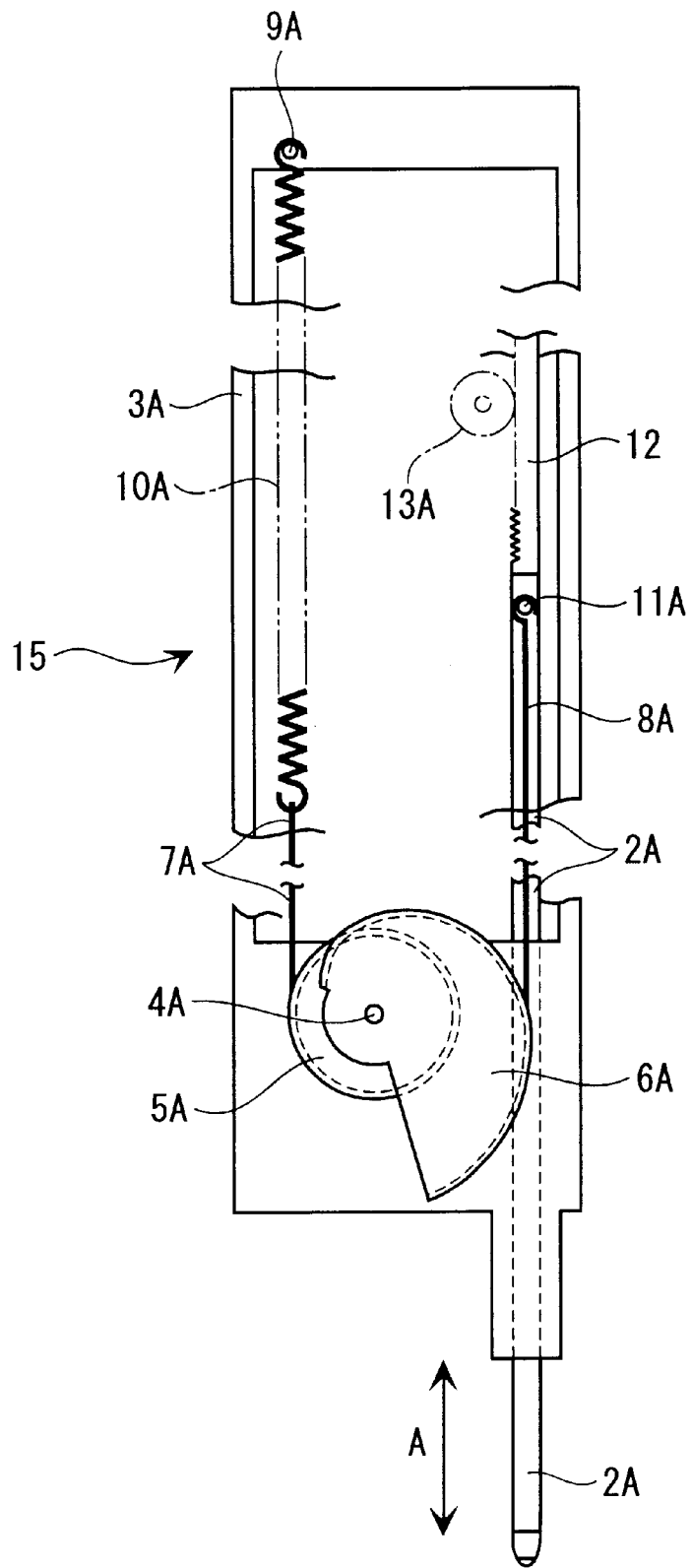
FIG. 1 is a front elevation of a constant pressure mechanism of a probe according to first embodiment of the present invention.

FIGS. 1 to 4 show the first embodiment of the present invention. FIG. 1 is an enlarged front elevation of the constant pressure mechanism of a probe.

As shown in FIG. 1, a probe 2A having a tip contact portion 2a for following a target surface (not shown) is supported slidably in arrow A direction relative to a case 3A (instrument stationary portion).

A circular pulley 5A and a spiral pulley 6A joined by a central axis 4A are rotatably supported to a lower end of the case 3A as the instrument stationary portion, and an end of wires 7A and 8A is respectively fixed to the circular pulley 5A and the spiral pulley 6A.

More specifically, in the first embodiment, a coil spring 10A having a fixed end fixed to an engage pin 9A on an upper side of the case 3A is located at an inside of the case 3A. A free end of the coil spring 10A is connected to one end of the wire 7A with the other end being fixed to the circular pulley 5A while being approximately parallel to a length of the probe 2A. Unidirectional rotational force is applied to the circular pulley 5A by a deforming stress of the coil spring 10A.

One end of the wire 8A having the other end fixed to the spiral pulley 6A is hooked to an engage pin 11A at inner end of the probe 2A while being approximately parallel to the probe 2A. Thus, the deforming stress of the coil spring 10A is transmitted to the probe 2A through the wire 7A, the circular pulley 5A, the spiral pulley 6A and the wire 8A, so that always constant downward protrusion force is applied to the probe 2A.

The coil spring 10A, the wire 7A and the circular pulley 5A constitute a rotational force urging mechanism 15.

A rod rack member 12A as an extension of the probe 2A is fixed to an inner end of the probe 2A and a counter pinion 13A rotatably supported in the case 3A is meshed to the rack member 12A. Accordingly, longitudinal displacement of the probe 2A along the target surface is converted to a rotation angle of the counter pinion 13A through the rack member 12A and the counter pinion 13A. The rotation angle of the counter pinion 13A is electrically converted to a converter (not shown), so that the displacement of the probe 2A is accurately measured.

The rack 12A, the counter pinion 13A and the converter constitute the counter mechanism.

Figure 3:
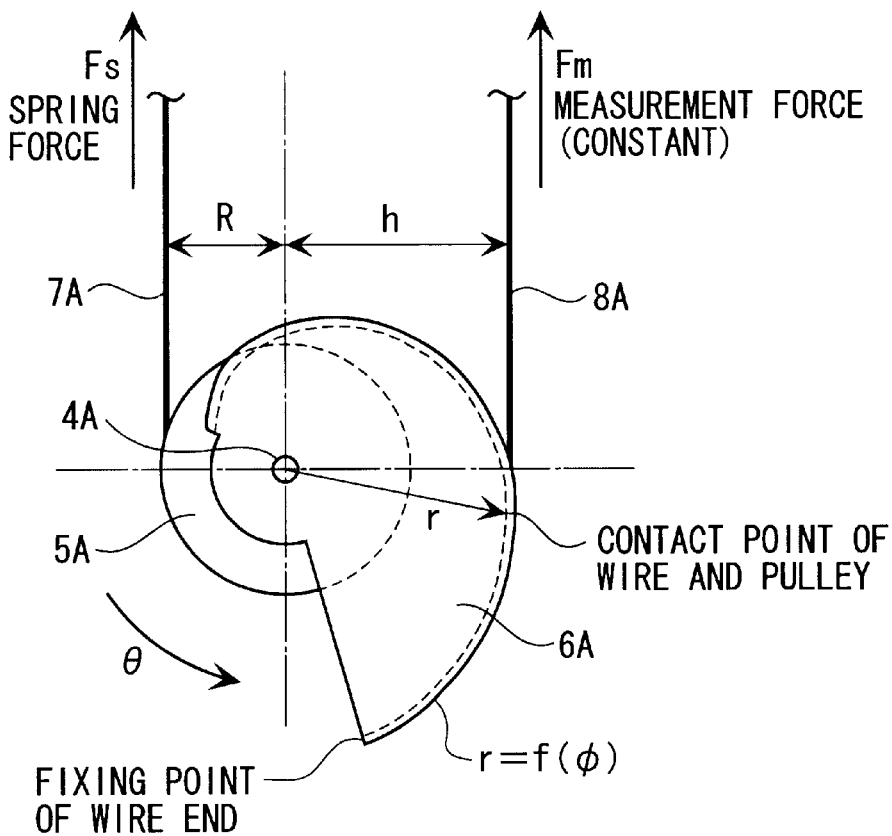
FIG. 3 is an enlarged view of a primary portion of the constant pressure mechanism of a probe.

FIG. 2 is an illustration of principle of the constant pressure mechanism of a probe according to the above-described first embodiment. In FIGS. 2 and 3, measurement force of the probe 2A is "Fm", radius of the circular pulley 5A is "R", and spring constant (stiffness) of the coil spring 10A is "K", where respective positions of the circular pulley 5A, the spiral pulley 6A and the probe 2A are origin when the wires 7A and 8A are vertically tense and the coil spring 10A is at its natural length. When the variables are respectively:

deforming stress; ts
extension of coil spring 10A; X
rotation angle of the circular pulley 5A and the spiral pulley 6A; θ (radian)
distance from the central axis 4A of the spiral pulley 6A to the wire 8A; h following equations stand true:

$$X = R*\theta \quad \text{(first equation)}$$

$$Fs = K*X \quad \text{(second equation)}$$

Further, when the mutually opposite torques applied to the circular pulley 5A and the spiral pulley 6A are equal, following equation stands true:

$$Fm*h = fs*R;$$

which can be modified as:

$$i\ h = (R/Fm)*fs \quad \text{(third equation)}$$

When the third equation is substituted by the first and the second equations, following relationship can be established.

$$h = (K*R^2/Fm)*\theta \quad \text{(fourth equation)}$$

In other words, a spiral satisfying the fourth equation can convert the deforming stress fs of the coil spring 10A into a constant measurement force Fm.

Figure 4:
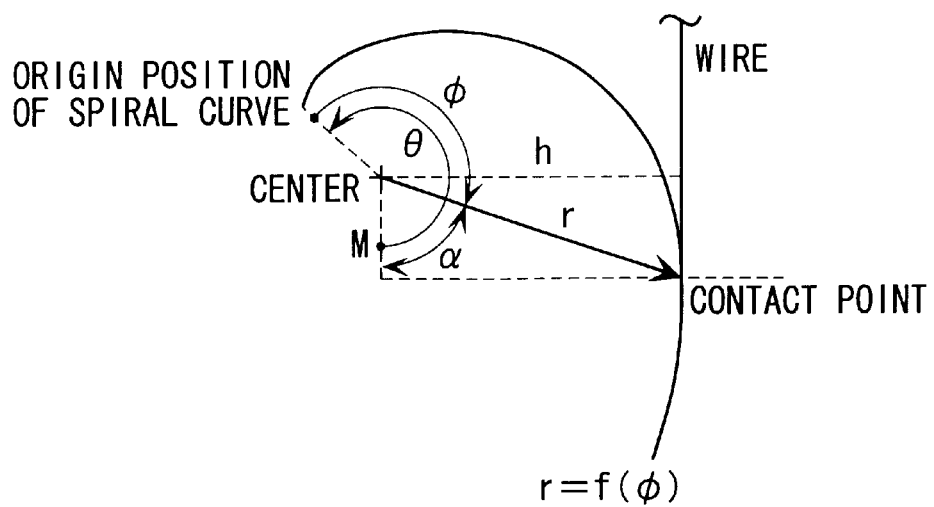
FIG. 4 is an illustration of a spiral curve of the constant pressure mechanism of a probe.

FIG. 4 shows a spiral of the spiral pulley 6A. When the spiral is represented by a polar coordinates where the radius is "r" and the angle is "φ", the relationship between "r" and "φ" can be described as follows:

$$r = f(\phi) \quad \text{(fifth equation)}$$

Here, when the point where the wire 8A put around the spiral pulley 6A touches the spiral curve is on a horizontal line a predetermined distance ("M") away from the center of the spiral pulley 6A, i.e. the central axis 4A:

$$r^2 - h^2 = M^2$$

which can be modified as:

$$r = \sqrt{M^2 + h^2} \quad \text{(sixth equation)}$$

Further, following relationship stands true:

$$h = M*\tan\alpha \quad \text{(seventh equation)}$$

$$\phi = \theta - \alpha \quad \text{(eighth equation)}$$

In comparing the fourth equation and the seventh equation, if:

$$M = K*R^2/Fm$$

$$\alpha = \tan^{-1}\theta$$

then, the fourth equation stands true, so that the spiral curve satisfies the present object.

At this time, the fifth, the sixth and the eighth equations can be represented by the following formulas:

$$r = f(\phi) = \frac{K \cdot R^2}{Fm}\sqrt{1^2 + \theta^2} \quad \text{(ninth equation)}$$

$$\phi = \theta - \tan^{-1}\theta \quad \text{(tenth equation)}$$

In other words, the curve represented by the ninth and the tenth equations is a spiral curve for converting the deforming stress of the coil spring 10A into a constant measuring force of the probe 2A.

Figure 5:
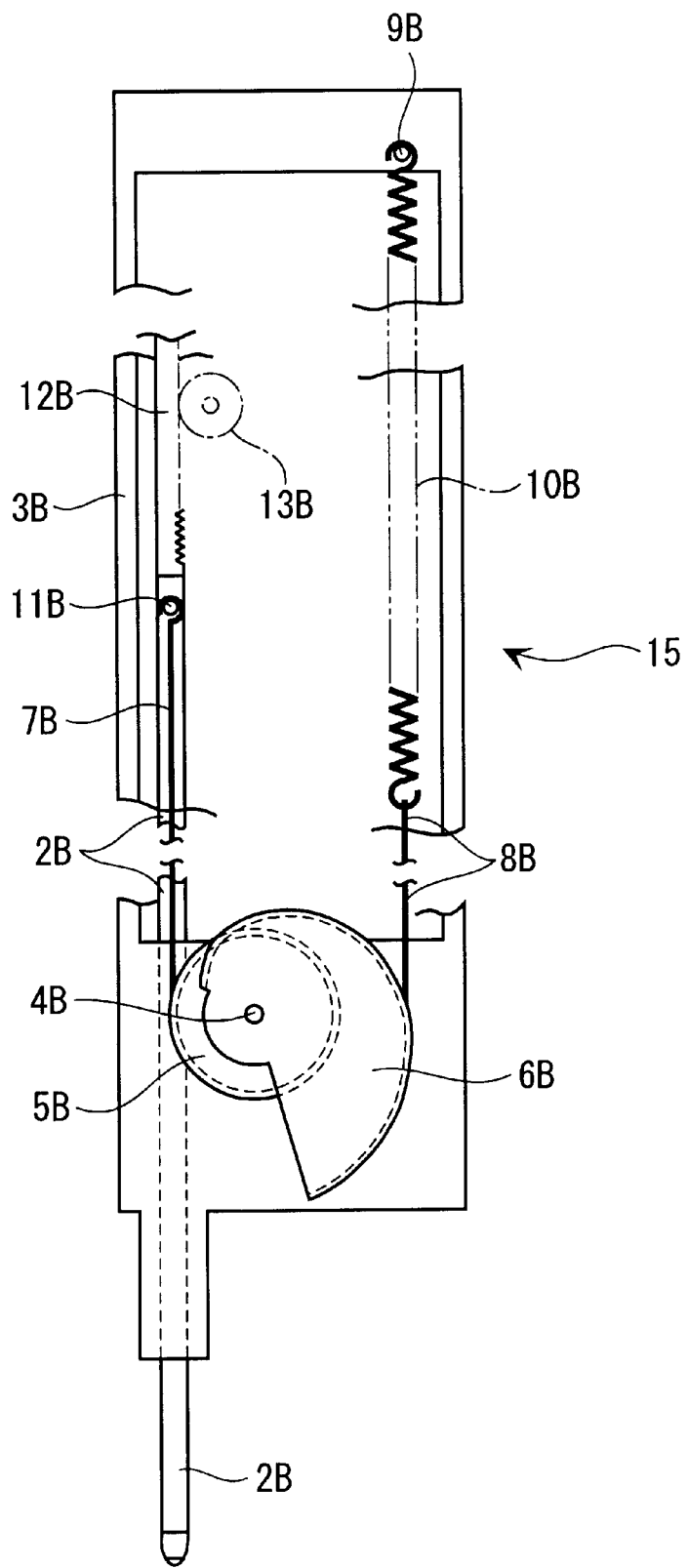
FIG. 5 is a front elevation of a constant pressure mechanism of a probe according to second embodiment of the present invention.

FIG. 5 is a front elevation of a constant pressure mechanism of a probe according to the second embodiment of the present invention corresponding to FIG. 1.

The constant pressure mechanism of a probe according to the present embodiment is identical with the first embodiment in that the constant pressure mechanism has a circular pulley 5B and a spiral pulley 6B rotatably supported on a lower end of a case 3B and jointed by a central axis 4B and that an end of the wires 7B and 8B is respectively fixed to the circular pulley 5B and the spiral pulley 6B.

In the second embodiment, a coil spring 10B having a fixed end secured to the engage pin 9B is located inside the case 3B and a free end of the coil spring 10B is connected to one end of the wire 8B with the other end being fixed to the spiral 6B while the coil spring 10B is approximately parallel to the longitudinal direction of the probe 2B.

Further, one end of the wire 7B with the other end being fixed to the circular pulley 5B is hooked to an engage pin 11B at inner end of the probe 2B while being parallel to the probe 2B, so that the deforming stress of the coil spring 10B is transmitted to the probe 2B through the wire 8B, the spiral pulley 6B, the circular pulley 5B and the wire 7B.

Accordingly, since the deforming stress of the coil spring 10B can be transmitted to the probe 2B through the wire 8B, the spiral pulley 6B, the circular pulley 5B and the wire 7B, a constant measuring force can be applied to the probe 2B irrespective of longitudinal displacement thereof as in the first embodiment.

The coil spring 10B, the wire 8B and the spiral pulley 6B constitute the rotation force urging mechanism 15.

The counter mechanism is the same as the first embodiment and description thereof is omitted here.

Figure 6A:
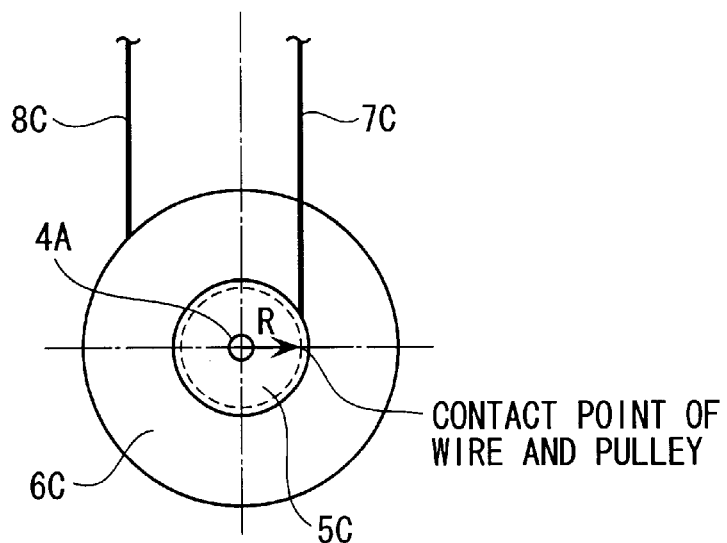
FIG. 6(*a*) is a front elevation of a primary portion of a constant pressure mechanism of a probe according to third embodiment of the present invention.
Figure 6B:
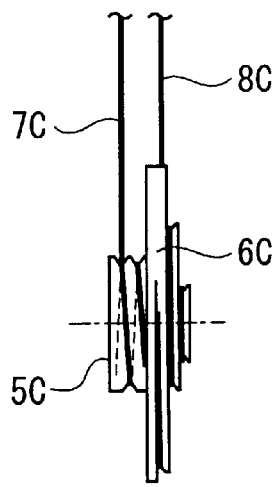
Figure 6C:
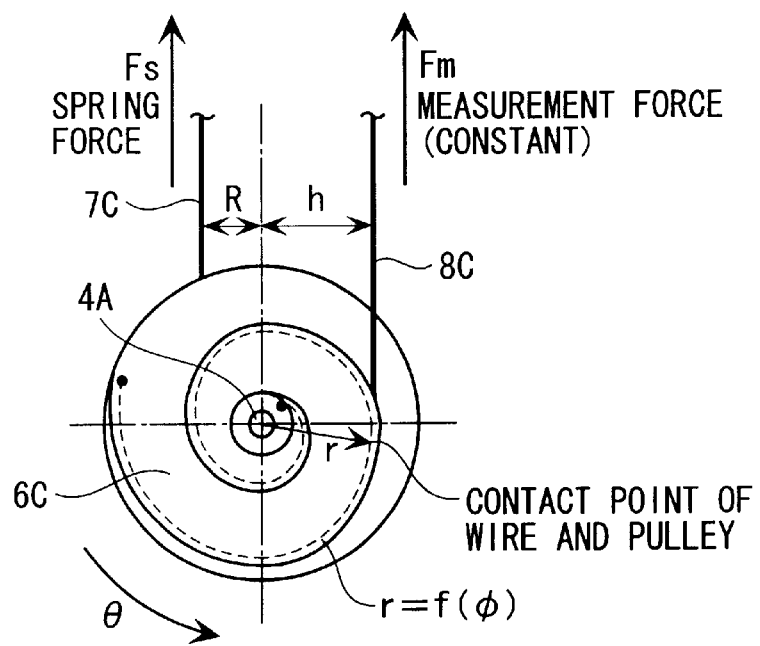

FIGS. 6(a), (b) and (c) show a constant pressure mechanism according to third embodiment of the present invention. In the present embodiment, the aforesaid circular pulleys 5A and 5B are modified into a circular pulley 5C having a wire 7C wound around for more than 360 degrees, and the aforesaid spiral pulleys 6A and 6B are modified into a spiral pulley 6C composed of a volute curve of more than 360 degrees. A wire 8C is located to a spiral groove of the spiral pulley 6C According to the above-described arrangement, the deforming stress of the coil spring (not illustrated; the same as the coil springs 10A and 10B of the aforesaid embodiments) can be converted into a constant measuring force applied to the probes 2A and 2B by the circular pulley 5C and the spiral pulley 6C. Further, the above arrangement is adapted to wide displacement of the probes 2A and 2B.

In the present embodiment, the coil spring (not shown), the wire 7C and the circular pulley 5C constitute the rotation force urging mechanism 15.

Figure 7A:
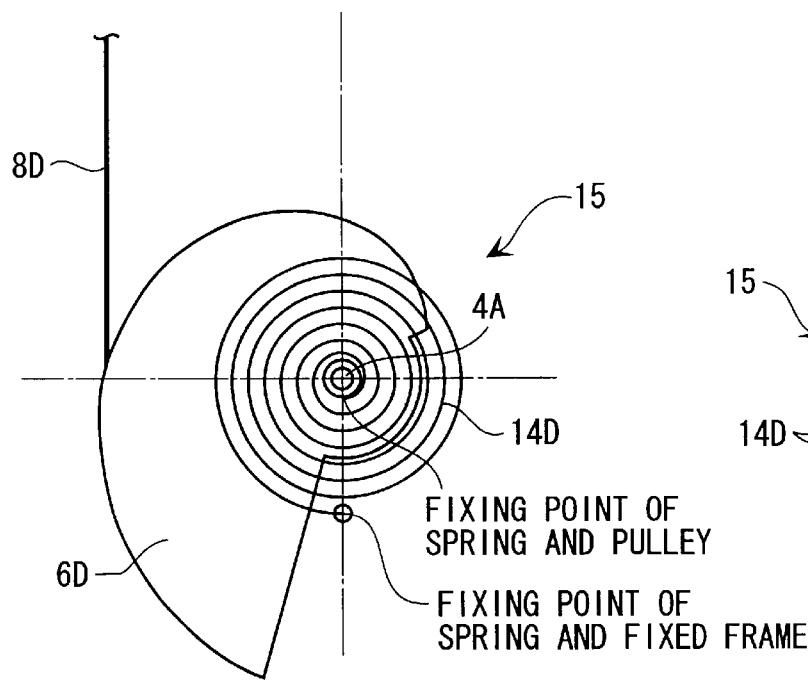
FIG. 7(*a*) is a rear elevation of a primary portion of a constant pressure mechanism according to fourth embodiment of the present invention.
Figure 7B:
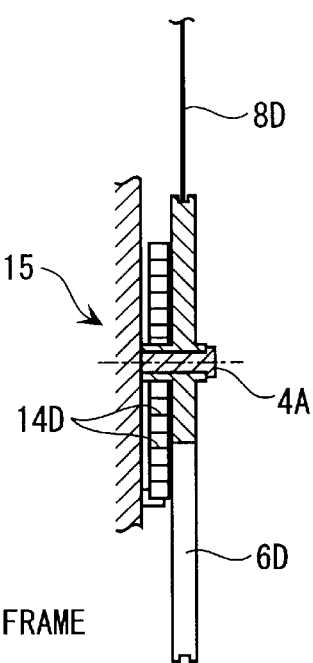
Figure 7C:
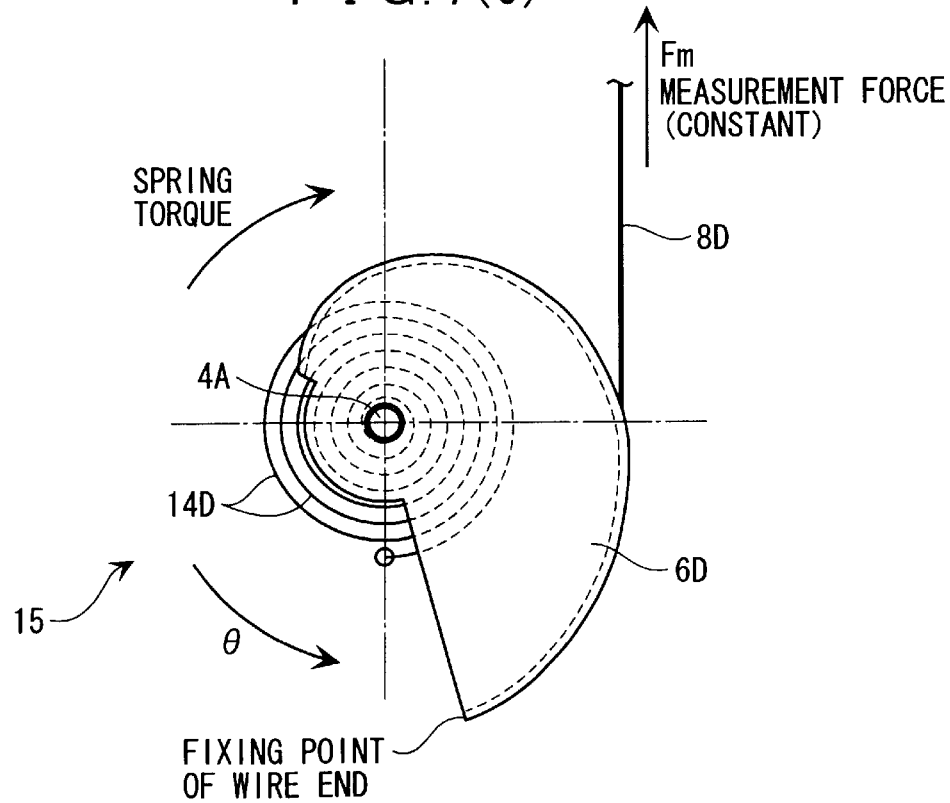

FIGS. 7(a), 7(b) and 7(c) respectively show rear elevation, side elevation and front elevation of the constant pressure mechanism of the fourth embodiment of the present invention. In the present embodiment, a spiral spring 14D is used as the rotation force urging mechanism. A free end of the spiral spring 14D is connected to a central axis 4A jointed with the spiral pulley 6D and the outer other end of the spiral spring 14D is secured to the instrument stationary portion. The arrangement of one end of the wire 8D with the other end being fixed to the spiral pulley 6D and the counter mechanism is the same as the aforesaid embodiments, and the description thereof is omitted.

In the present embodiment, the spiral spring 14D constitutes the rotation force urging mechanism 15.

Figure 8A:
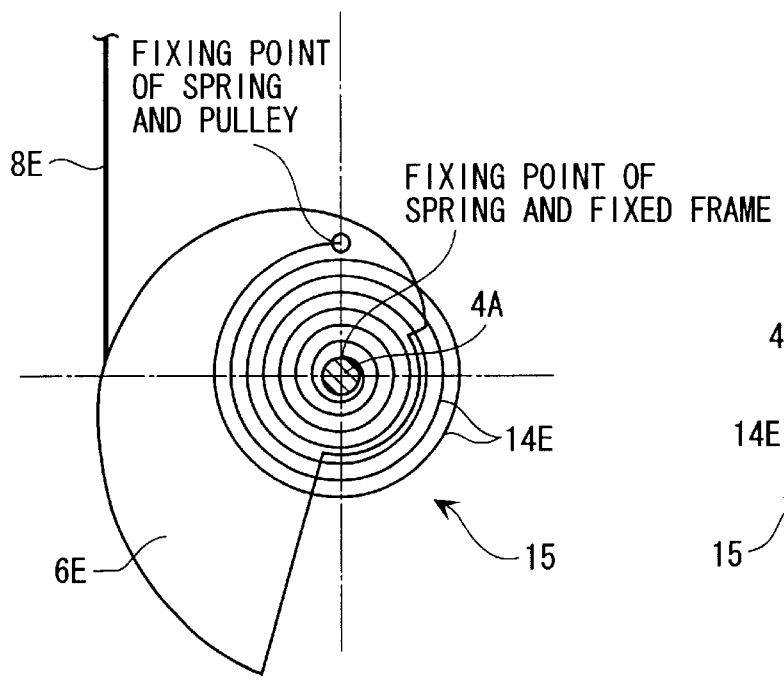
FIG. 8(*a*) is a rear elevation of a primary portion of a constant pressure mechanism of a probe according to fifth embodiment of the present invention.
Figure 8B:
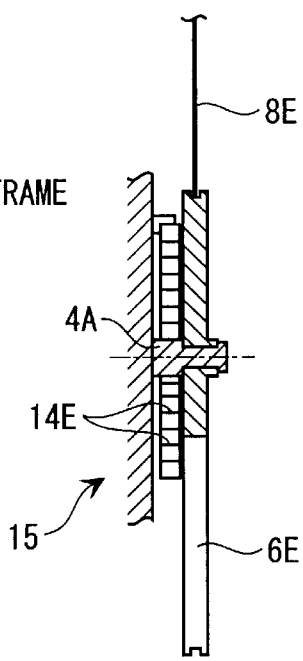
Figure 8C:
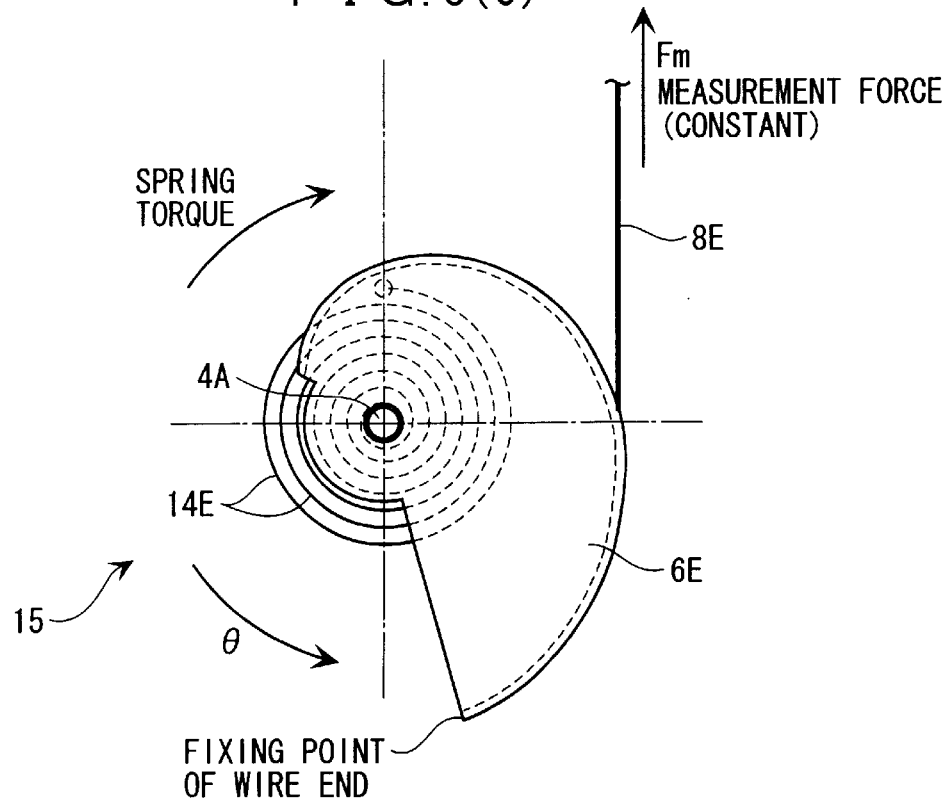

FIGS. 8(a), 8(b) and 8(c) are respectively rear elevation, side elevation and front elevation of a constant pressure mechanism of the fifth embodiment of the present invention. In the present embodiment, a spiral spring 14E is used as the rotation force urging mechanism. The present embodiment is the same as the fourth embodiment except that an outer free end of the spiral spring 14E is connected to the spiral pulley 6E and the inner other end of the spiral spring 14E is fixed to the instrument stationary portion.

In the present embodiment, the spiral spring 14E constitutes the rotation force urging mechanism 15.

In the fourth and fifth embodiment, since the spiral spring 14D and 14E are used, the deforming stress of the spiral springs 14D and 14E can be converted into constant measuring force applied to the probe by the spiral pulley 6D and 6E, thus being adapted to wide displacement of the probe.

Further, when the spiral springs 14D and 14E are used as the rotation force urging mechanism and the displacement of the probe is relatively small, the circular pulley can be used instead of the spiral pulleys 6D and 6E for maintaining substantially constant measuring force.

Though the coil spring is used in the first to third embodiments, when the displacement is within a small range, plate springs etc. can be used instead of the coil spring for reducing the entire size of the instrument.

Further, though the spring is fixed to the instrument stationary portion at one position, the engage pin may be arranged as a movable mechanism using a screw etc. and a measurement force adjuster may be provided by the movable fixing position. Alternatively, in the similar manner, the measurement force adjuster may be provided by letting a spring connecting position on the pulley side to be movable.

What is claimed is:

1. A constant pressure mechanism of a probe for unidirectionally urging the probe in a predetermined direction by virtue of elastic force of a spring, comprising:

a first pulley rotatably supported around a central axis by an instrument stationary portion;

a rotation force urging mechanism for urging the first pulley in a predetermined rotation direction; and a first wire having a first end fixed to the first pulley and a second end joined to the probe, wherein the rotation force urging mechanism includes:

a second pulley coaxial with the first pulley and capable of combined rotation therewith; and a second wire having an end fixed to the second pulley, and the spring having one end fixed to the instrument stationary portion with a free end joined to the other end of the second wire;

wherein the first pulley and the second pulley are respectively either a circular pulley or a spiral pulley; and wherein a radius "r" and an angle "φ" of polar coordinates of a spiral drawn by the contact point between the spiral pulley and the first or the second wire are represented by the following equations:

$$r = f(\phi) = \frac{K \cdot R^2}{Fm}\sqrt{1+\theta^2}$$

where "f(φ)" represents an function of the rotation angle "φ";

"K" represents spring constant of the spring;

"R" represents a radius of the circular pulley;

"Fm" represents measurement force of the probe; and

"θ" represents a rotation angle of the circular pulley and the spiral pulley.

2. The constant pressure mechanism of a probe according to claim 1, wherein the spring is a coil spring.

3. The constant pressure mechanism of a probe according to claim 1, wherein the spring is a plate spring.

4. The constant pressure mechanism of a probe according to claim 1, wherein the rotation force urging mechanism includes a spiral spring having an end being fixed to the instrument stationary portion and the other end being jointed to the first pulley.

5. The constant pressure mechanism of a probe according to claim 1, wherein a counter mechanism is connected to an inner end of the probe.

* * * * *